United States Patent
Choi et al.

(10) Patent No.: US 11,609,922 B2
(45) Date of Patent: Mar. 21, 2023

(54) CONNECTED CAR BIG DATA ACQUISITION DEVICE, SYSTEM AND METHOD FOR STORING DATA GATHERED IN A SINGLE PLATFORM

(71) Applicant: Korea Electronics Technology Institute, Seongnam-si (KR)

(72) Inventors: Hyosub Choi, Yongin-si (KR); Jeonghoon Kang, Seoul (KR); Jaejin Ko, Gwangju-si (KR); Changwoo Kim, Suwon-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 420 days.

(21) Appl. No.: 16/690,383

(22) Filed: Nov. 21, 2019

(65) Prior Publication Data

US 2020/0242115 A1 Jul. 30, 2020

(30) Foreign Application Priority Data

Jan. 25, 2019 (KR) .................. 10-2019-0009586

(51) Int. Cl.
*G06F 16/00* (2019.01)
*G06F 16/2458* (2019.01)
(Continued)

(52) U.S. Cl.
CPC ........ *G06F 16/2465* (2019.01); *G06F 9/3871* (2013.01); *G06F 9/5016* (2013.01); *H04W 4/44* (2018.02)

(58) Field of Classification Search
None
See application file for complete search history.

(56) References Cited

U.S. PATENT DOCUMENTS 6,760,826 B2 * 7/2004 Ozdemir ............... G06F 12/023
711/170
7,164,117 B2 * 1/2007 Breed ................. B60R 21/0152
250/221
(Continued)

FOREIGN PATENT DOCUMENTS

EP        2 284 079 B1    2/2013
KR  10-2015-0076192 A    7/2015
(Continued)

OTHER PUBLICATIONS

CarStream: an industrial system of big data processing for internet-of-vehicles, Zhang et al., (Year: 2017).*
(Continued)

*Primary Examiner* — Jean M Corrielus
(74) *Attorney, Agent, or Firm* — NSIP Law

(57) ABSTRACT

The present disclosure provides a connected car big data acquisition device, and connected car big data collecting system and method using the device. A connected car big data acquisition device includes: an interface configured to communicate with a device associated with a data production layer and a device associated with a service using layer; a storage configured to store data; and a controller configured to generate preprocessed data based on raw data related to connected cars received from a device associated with a data production layer through a preprocessing process using an integrated platform and to control the preprocessed data to be stored in the storage based on a memory availability ratio of the storage.

19 Claims, 5 Drawing Sheets

(51) Int. Cl.
*H04W 4/44* (2018.01)
*G06F 9/50* (2006.01)
*G06F 9/38* (2018.01)

(56) References Cited

U.S. PATENT DOCUMENTS

| | | | | |
|---|---|---|---|---|
| 7,527,288 | B2* | 5/2009 | Breed | B60R 21/0132 |
| | | | | 280/735 |
| 7,663,502 | B2* | 2/2010 | Breed | G08B 29/181 |
| | | | | 340/7.29 |
| 10,113,952 | B2* | 10/2018 | Washburn | G01N 29/2418 |
| 10,382,294 | B2* | 8/2019 | Bali | H04L 43/04 |
| 10,599,155 | B1* | 3/2020 | Konrardy | G06N 3/0454 |
| 10,719,886 | B1* | 7/2020 | Konrardy | G07C 5/0808 |
| 10,824,145 | B1* | 11/2020 | Konrardy | G06F 30/20 |
| 11,127,290 | B1* | 9/2021 | Fields | B60W 50/14 |
| 2002/0069338 | A1* | 6/2002 | Ozdemir | G06F 12/023 |
| | | | | 711/171 |
| 2005/0005083 | A1* | 1/2005 | Ozdemir | G06F 12/023 |
| | | | | 711/170 |
| 2015/0163289 | A1 | 6/2015 | Paul et al. | |
| 2016/0094421 | A1* | 3/2016 | Bali | H04L 67/28 |
| | | | | 709/223 |
| 2016/0328168 | A1 | 11/2016 | Wei et al. | |
| 2018/0336780 | A1 | 11/2018 | Ran et al. | |
| 2019/0034767 | A1* | 1/2019 | Sainani | G06V 10/95 |
| 2020/0364953 | A1* | 11/2020 | Simoudis | G06N 5/022 |

FOREIGN PATENT DOCUMENTS

| | | |
|---|---|---|
| KR | 10-2015-0125441 A | 11/2015 |
| KR | 10-2015-0144477 A | 12/2015 |
| KR | 10-1668397 B1 | 10/2016 |
| KR | 10-1817683 B1 | 1/2018 |
| KR | 10-2018-0026301 A | 3/2018 |
| KR | 10-2018-0072295 A | 6/2018 |
| KR | 10-2018-0080939 A | 7/2018 |
| KR | 10-2018-0098062 A | 9/2018 |
| KR | 10-2018-0112393 A | 10/2018 |

OTHER PUBLICATIONS

Korean Office Action dated Aug. 6, 2021, in counterpart Korean Patent Application No. 10-2019-0009586 (6 pages in Korean).
Korean Notice of Allowance dated Feb. 22, 2022, in counterpart Korean Patent Application No. 10-2019-0009586 (5 pages in Korean).

* cited by examiner

CONNECTED CAR BIG DATA ACQUISITION DEVICE, SYSTEM AND METHOD FOR STORING DATA GATHERED IN A SINGLE PLATFORM

CROSS-REFERENCE TO RELATED APPLICATION

The present application claims priority to Korean Patent Application No. 10-2019-0009586, filed on Jan. 25, 2019, in the Korean Intellectual Property Office, which is incorporated herein in its entirety by reference.

TECHNICAL FIELD

The present disclosure relates to a device and method of establishing big data and, more particularly, to a device and method of collecting big data by acquiring connected car big data in an integrated platform and storing the collected data into a storage at a high speed.

BACKGROUND

A connected car is a vehicle equipped with an Internet access capability. The connected car may be connected to an Internet server, another vehicle, and transportations and communications infrastructure through a wireless communications network so as to enable the user to enjoy various services such as a risk alert, a navigation based on real-time traffic information, remote vehicle control and management services, email, multimedia streaming, and social networking services. The connected car is expected to evolve in the future to add autonomous driving, automatic charging, and checking driver's health or blood alcohol level to determine a driving ability of the driver, for example.

In recent years, research and development have been conducted to establish big data by aggregating raw data generated by connected cars and related devices and utilize such data in analyzing traffic accidents and predictive maintenances of vehicle parts.

However, the raw data that needs to be gathered for the establishment of the connected car big data may be different from vehicle to vehicle, and accordingly, a use of some of gathered data requires a preprocessing of the data to convert the data into a usable form, which is man-hour consuming and is becoming an obstacle slowing down the use of the data.

Further, when the gathered raw data is sequentially stored in a database through a single TCP/IP session, it may take a long time (e.g. a few seconds) to insert the data into the database in case that the amount of data is large.

PRIOR ART REFERENCE

[Patent Literature]
Korean patent publication No. 10-1817683 published on Jan. 12, 2018

SUMMARY

Provided are a connected car big data acquisition device, and connected car big data collecting system and method for integrating the big data related to connected cars into a single one platform.

Provided are a connected car big data acquisition device, and connected car big data collecting system and method for storing data gathered in the single platform for establishing the connected car big data at a high speed.

Additional aspects will be set forth in part in the description which follows and, in part, will be apparent from the description, or may be learned by practice of the presented exemplary embodiments.

According to an aspect of an exemplary embodiment, a connected car big data acquisition device includes: an interface configured to communicate with a device associated with a data production layer and a device associated with a service using layer; a storage configured to store data; and a controller configured to generate preprocessed data based on raw data related to connected cars received from a device associated with a data production layer through a preprocessing process using an integrated platform and to control the preprocessed data to be stored in the storage based on a memory availability ratio of the storage.

The controller may include the integrated platform combining the device associated with the data production layer, a device associated with a data receiving layer, and a device associated with a service using layer for the raw data.

The controller may control the preprocessed data to be stored in the storage separately for dynamic data and static data.

The controller may calculate the memory availability ratio of the storage by a following equation:

$$MemAvailable(\%) = 100 - \left(\frac{MemTotal - MemFree}{MemTotal} \times 100\right)$$

where 'MemAvailable' refers to the memory availability ratio, 'MemTotal' refers to a total capacity of the memory, and 'MemFree' refers to a memory capacity currently being unused.

The controller may fragment the preprocessed data in a unit of a chunk having a prescribed size according to the memory availability ratio.

The controller may set the size of the chunk larger as the memory availability rate is larger.

The controller may store the preprocessed data fragmented into a plurality of chunks in the storage by an asynchronous multiprocessing.

When a service request is received from a device associated with a service using layer, the controller may make data related to the service request among preprocessed data stored in the storage is provided to the device having sent the service request.

The raw data may include business-to-business (B2B) data, business-to-consumer (B2C) data, and infrastructure data in terms of a business while including dynamic data and static data on a real-time basis.

According to an aspect of another exemplary embodiment, a connected car big data collecting system includes: a business-to-business (B2B) data production device configured to produce B2B data which is dynamic vehicle data in a course of business; a business-to-consumer (B2C) data production device configured to produce B2C data which is dynamic vehicle data and occupied by a driver or a passenger; an infrastructure data production device configured to produce dynamic infrastructure data and static infrastructure data related to an infrastructure of a connected car; at least one user terminal configured to enable a user to receive a service related to the connected car; and a connected car big data acquisition device configured to receive raw data including at least one of the B2B data, the B2C data, and the infrastructure data from the B2B data production device, the B2C data production device, and the infrastructure data production device, respectively, preprocess the raw data, store preprocessed data, and, upon receiving a service request from the user terminal, provide data related to the service request to the user terminal. The connected car big data acquisition device includes: an interface configured to communicate with the B2B data production device, the B2C data production device, the infrastructure data production device, and the user terminal; a storage configured to store data; and a controller configured to generate preprocessed data based on the raw data through a preprocessing process using an integrated platform and to control the preprocessed data to be stored in the storage based on a memory availability ratio of the storage.

According to another aspect of another exemplary embodiment, a connected car big data collecting system includes: a dynamic data production device configured to produce dynamic vehicle data generated with regard to a business entity, a driver, or a passenger, and dynamic infrastructure data related to an infrastructure of a connected car; a static data production device configured to produce static infrastructure data related to the infrastructure; at least one user terminal configured to enable a user to receive a service related to the connected car; and a connected car big data acquisition device configured to receive raw data including at least one of the dynamic vehicle data, the dynamic infrastructure data, and the static infrastructure data from the dynamic data production device or the static data production device, preprocess the raw data, store preprocessed data, and, upon receiving a service request from the user terminal, provide data related to the service request to the user terminal. The connected car big data acquisition device includes: an interface configured to communicate with the dynamic data production device, the static data production device, and the user terminal; a storage configured to store data; and a controller configured to generate preprocessed data based on the raw data through a preprocessing process using an integrated platform and to control the preprocessed data to be stored in the storage based on a memory availability ratio of the storage.

According to an aspect of yet another exemplary embodiment, a connected car big data collecting method includes: receiving raw data related a connected car, by a connected car big data acquisition device, from a device associated with a data production layer; generating preprocessed data by preprocessing the raw data, by the connected car big data acquisition device, by using an integrated platform combining devices associated with the data production layer; and storing the preprocessed data, by the connected car big data acquisition device, according to a memory availability ratio.

The present disclosure can simplify a computational structure of the system by aggregating the big data related to connected cars in a single platform, preprocessing the big data, and storing the preprocessed data at a high speed to make it unnecessary to preprocess each of the stored data whenever the data is used.

Further, the feature of storing the integrated big data at a high speed enables to save cost and time for maintaining the system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
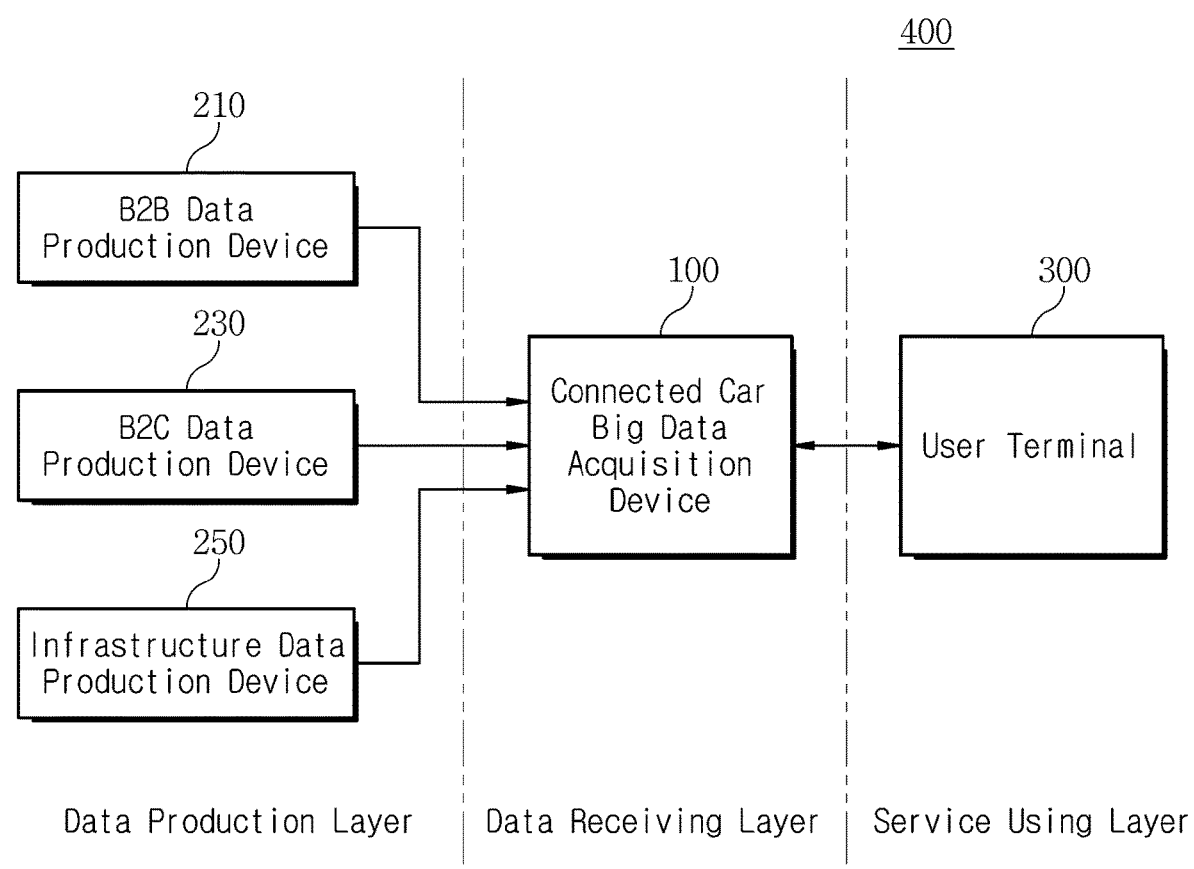
FIG. 1 is a block diagram of a connected car big data collecting system according to a first embodiment of the present disclosure.

The drawings described herein are for illustration purposes only and are not intended to limit the scope of the present disclosure in any way.

DETAILED DESCRIPTION

For an understanding of the features and advantages of the present disclosure, the present disclosure will be described in detail with reference to the accompanied drawings. It is to be noted that the same components are designated by the same reference numerals throughout the drawings. In the following description and the accompanied drawings, detailed descriptions of well-known functions or configuration that may obscure the subject matter of the present disclosure will be omitted for simplicity.

Figure 2:
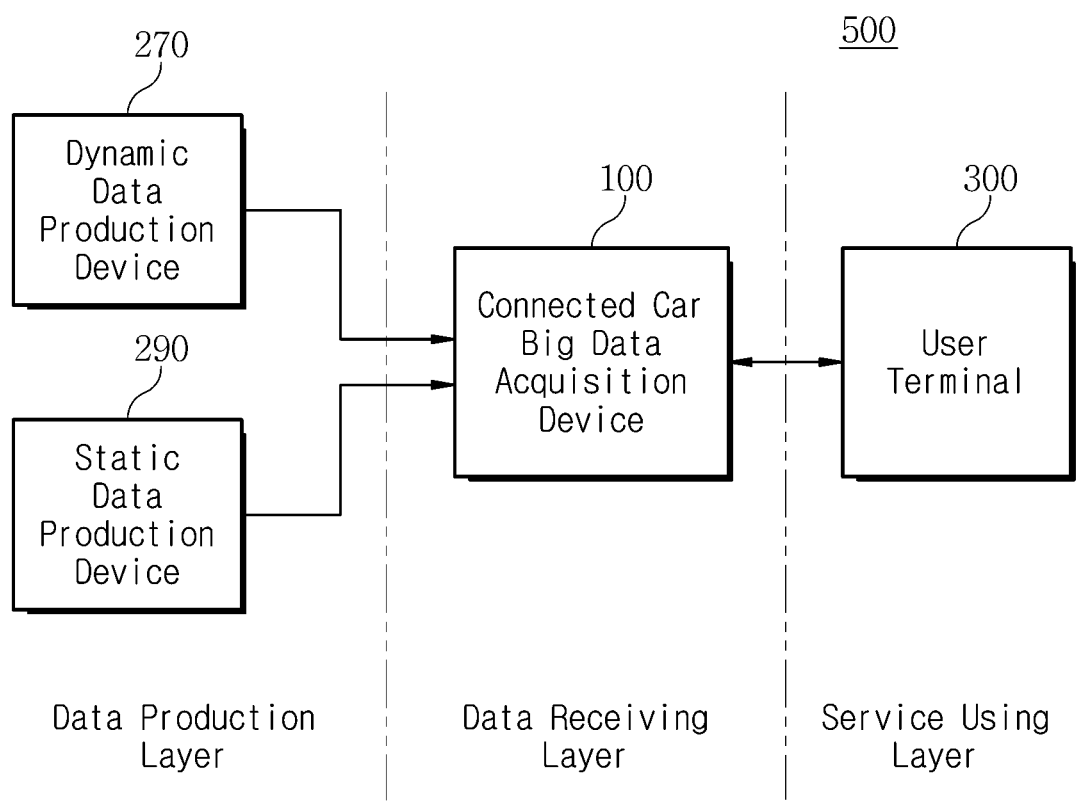
FIG. 2 is a block diagram of a connected car big data collecting system according to a second embodiment of the present disclosure.

FIG. 1 is a block diagram of a connected car big data collecting system according to a first embodiment of the present disclosure, and FIG. 2 is a block diagram of a connected car big data collecting system according to a second embodiment of the present disclosure.

Referring to FIGS. 1 and 2, the connected car big data collecting system (hereinafter, referred to as "acquisition system") 400 and 500 integratively collect big data generated by connected cars and stores such data at high speed to provide big data services. Each of the collection systems 400 and 500 may be divided largely into a data production layer, a data receiving layer, and a service using layer.

The data production layer produces information generated by devices mounted in connected cars, information collected during vehicle management, information generated by drivers, or the like. The data production layer includes lots of data production devices which range may be categorized according to a certain criteria regarding a production of raw data. For example, in a first embodiment, the data production layer may include a business-to-business (B2B) data production device 210, a business-to-consumer (B2C) data production device 230, and an infrastructure data production device 250 which are distinguished from a business point of view. In a second embodiment, the data production layer may include a dynamic data production device 270 and a static data production device 290 which are classified on a real-time basis. Here, the raw data refers to all data that can be collected in connection with the connected cars.

The B2B data production device 210 includes at least one of a digital tachograph (DTG), an on-board diagnostic (OBD-II) device, and a message display terminal (MDT) occupied by a business entity, and produces B2B data which is dynamic vehicle data that the business entity may encounter in the course of business. The B2B data production device 210 may transmit the B2B data to the data receiving layer through a vehicle-to-everything (V2X) network, for example.

The B2C data production device 230 includes at least one of a vehicle sensor device and a wearable device occupied by a driver or a passenger, and produces B2C data which is dynamic data generated by the vehicle sensor device or the wearable device. The B2C data production device 230 may transmit the B2C data to the data receiving layer through a mobile network.

The infrastructure data production device 250 produces dynamic or static infrastructure data related to an infrastructure of the connected cars. The infrastructure data may include plain text data formatted in a comma-separated values (CSV) file, a spreadsheet, a Hypertext Markup Language (HTML) page, or SQL statements, for example, related to connected cars and data provided by open public data source through representational state transfer (REST) application program interfaces (APIs). The infrastructure data production device 250 transmits the infrastructure data to the data receiving layer.

The dynamic data production device 270 produces the dynamic vehicle data generated by the business entity, the driver, or the passenger, and the dynamic infrastructure data related to the infrastructure. The dynamic data production device 270 transmits the dynamic vehicle data to the data receiving layer. As mentioned above, the dynamic data may include the B2B data, the B2C data, and the infrastructure data.

The static data production device 290 produces static infrastructure data related to the infrastructure. The static data production device 290 transmits the static infrastructure data to the data receiving layer. Here static data includes infrastructure data.

The data receiving layer, which mediates data transaction between the data production layer and the service using layer, receives the raw data from the data production layer and stores the received raw data in a standardized form after a certain preprocessing of the received raw data. The data receiving layer may include a connected car big data acquisition device (hereinafter, referred to as "acquisition device") 100.

The acquisition device 100 receives the raw data and preprocesses the received raw data. Here, the 'preprocessing' may include a conversion of various formats of the raw data into a single standardized format. The acquisition device 100 may use an integrated platform for the preprocessing operation. The acquisition device 100 stores preprocessed data at a high speed. The acquisition device 100 may provide the stored data to a client in response to a service request of the client.

The service using layer includes service users of the connected car big data services and ser1vice applications redefined through the provided services. The service using layer includes at least one user terminal 300.

The user terminal 300 provides its user with connected car related services. The user terminal 300 may send the service request to the acquisition device 100 to receive data related to service request. The user terminal 300 can use all the received data in an analysis of the data, or extract only necessary portion of the data to conduct a research and development for a new application. The user terminal 300 may include a computing system such as a smartphone, a desktop PC, a laptop PC, a tablet PC, and a handheld PC.

Figure 3:
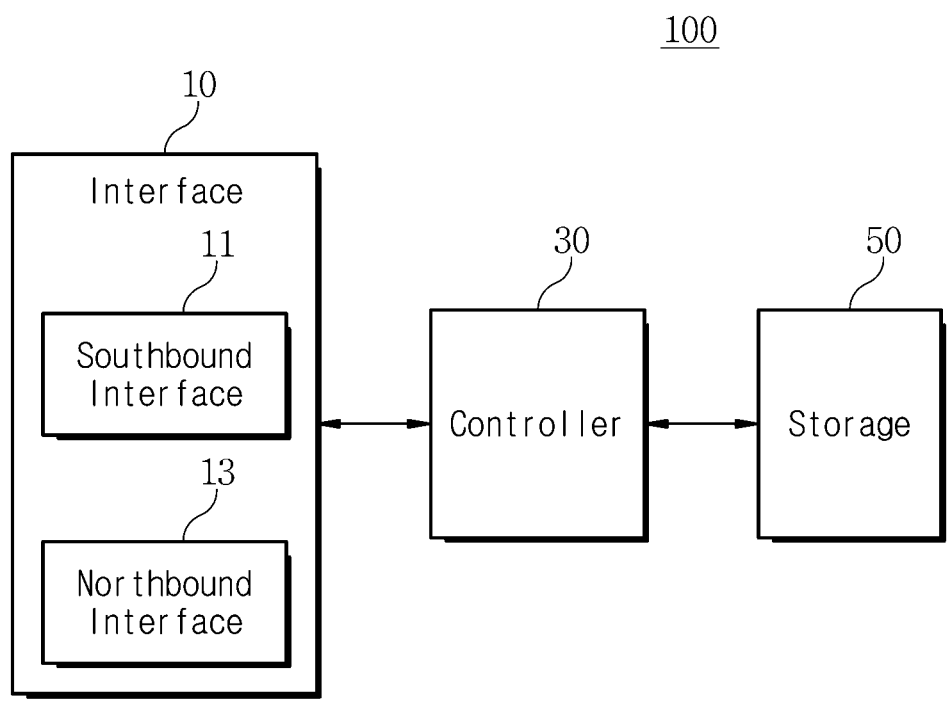
FIG. 3 is a block diagram of a connected car big data acquisition device according to an exemplary embodiment of the present disclosure.
Figure 4:
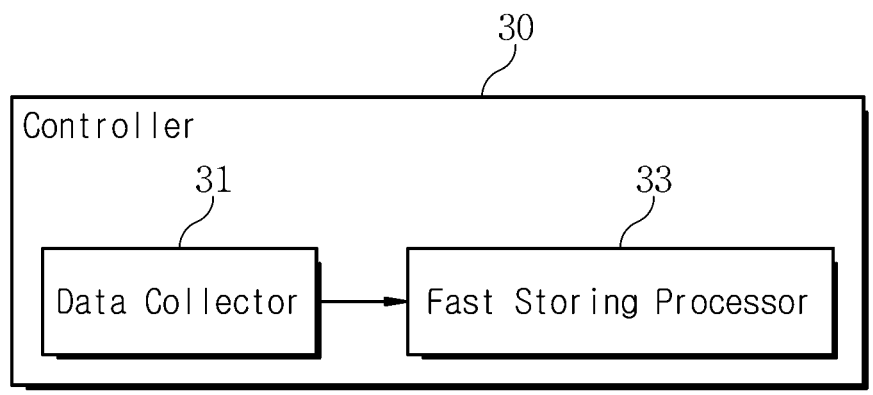
FIG. 4 is a block diagram of a controller shown in FIG. 3 according to an exemplary embodiment of the present disclosure.

FIG. 3 is a block diagram of the acquisition device 100 according to an exemplary embodiment of the present disclosure, and FIG. 4 is a block diagram of a controller shown in FIG. 3 according to an exemplary embodiment of the present disclosure.

Referring to FIGS. 1-4, the acquisition device 100 includes an interface 10, a controller 30, and a storage 50.

The interface 10 communicates with a device associated with the data production layer and a device associated with the service using layer. The device associated with the data production layer may include at least one of the B2B data production device 210, the B2C data production device 230, the infrastructure data production device 250, the dynamic data production device 270, and the static data production device 290. The device associated with the service using layer includes at least one user terminal 300. The interface 10 includes a southbound interface 11 and a northbound interface 13. The southbound interface 11 communicates with the device associated with the data production layer. In other words, the southbound interface 11 receives information transmitted from the data production layer. The northbound interface 13 communicates with the device associated with the service using layer. In other words, the northbound interface 13 transmits information requested via the service request, to the device associated with the service using layer, among the information which has been preprocessed and stored in the acquisition device 100.

The controller 30 generates the preprocessed data based on the raw data related to the connected car received from the device associated with the data production layer through a preprocessing process using the integrated platform. The controller 30 controls the preprocessed data to be stored in the storage 50 based on a memory availability ratio of the storage 50. The controller 30 includes a data collector 31 and a fast storing processor 33.

The data collector 31 acquires the raw data. The data collector 31 may acquire the raw data separately for the B2B data, the B2C data, and the infrastructure data. The data collector 31 performs the preprocessing on the acquired raw data according to a prescribed common standard. For this purpose, the data collector 31 may include the integrated platform combining the devices associated with the data production layer, the data receiving layer, and the service using layer for the raw data. The integrated platform allows the data collector 31 to generate the preprocessed data converted from the raw data into the single standardized format.

The fast storing processor 33 makes the preprocessed data to be stored in the storage 50 at a high speed. The fast storing processor 33 controls the preprocessed data to be stored in the storage 50 based on the memory availability ratio of the storage 50. At this time, the fast storing processor 33 may control the preprocessed data to be stored in the storage 50 separately for the dynamic data and the static data.

In detail, the fast storing processor 33 calculates the memory availability ratio of the storage 50 by using a following equation 1.

$$MemAvailable(\%) = 100 - \left(\frac{MemTotal - MemFree}{MemTotal} \times 100\right) \quad \text{[Equation 1]}$$

Here, 'MemAvailable' refers to the memory availability ratio, 'MemTotal' refers to a total capacity of the memory installed in the device, and 'MemFree' refers to a memory capacity currently being unused or not containing any useful information.

The fast storing processor 33 stores the preprocessed data in the storage 50 using a fast storing algorithm. That is, the fast storing processor 33 stores the preprocessed data in the storage 50 by an asynchronous multiprocessing while adaptively changing a size of a chunk unit of the preprocessed data according to the memory availability ratio. The greater the memory availability ratio is, the larger the fast storing processor 33 can set the chunk unit. This allows the fast storing processor 33 to store preprocessed data at a high speed.

The fast storing processor 33 calculates a current memory availability ratio of the storage 50 and sets a size of the chunk according to the current memory availability ratio. For example, in case that the memory availability ratio is smaller than 20%, the fast storing processor 33 may set size of the chunk to 1000 data items and write the preprocessed data in a unit of the chunk. In case that the memory availability ratio is greater than or equal to 20% and smaller than 50%, the fast storing processor 33 may set size of the chunk to 3000 data items and write the preprocessed data in the unit of the chunk. In case that the memory availability ratio is greater than or equal to 50%, the fast storing processor 33 may set size of the chunk to 5000 data items and write the preprocessed data in the unit of the chunk. The fast storing processor 33 may store the preprocessed data in each session through an asynchronous process. More details of the high speed storing operation will be described below with reference to FIG. 6.

When the service request is received from the device associated with the service using layer, the fast storing processor 33 retrieves information related to the service request among preprocessed data stored in the storage 50. The fast storing processor 33 provides the retrieved preprocessed data to the device having sent the service request. At this time, the fast storing processor 33 may control the preprocessed data to be provided through the northbound interface 13.

The storage 50 stores data. The storage 50 may be a separate device such as a storage server. That is, the storage 50 may store the preprocessed data in a database by inserting the data directly or inserting the data through a remote session using a TCP communication. The storage 50 may use a database accessible by the fast storing processor 33 to transmit and receive data to and from the fast storing processor 33. The storage 50 may be implemented by configuring a Mongo database which is developed by MongoDB Inc. and is one of representative NoSQL databases, but the present disclosure is not limited thereto. The Mongo database is easy to build and use since it has a non-SQL or non-relational structure and can store various information ranging from unstructured and inoperable data such as text to formatted and operable data. The storage 50 may include at least one recording medium among a flash memory, a hard disk, a multimedia card micro, a card type memory such as a SD memory and a XD memory, a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Figure 5:
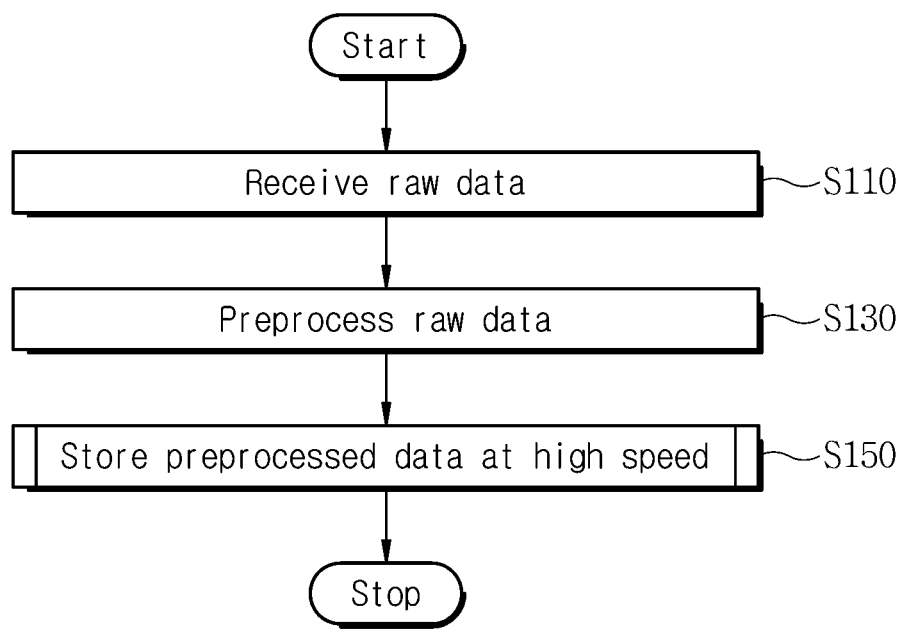
FIG. 5 is a flowchart illustrating a connected car big data collecting method according to an exemplary embodiment of the present disclosure.

FIG. 5 is a flowchart illustrating a connected car big data collecting method according to an exemplary embodiment of the present disclosure.

Referring to FIGS. 1, 2 and 5, the connected car big data collecting method (hereinafter, referred to as "collecting method") can simplify a computational structure of the system by aggregating the big data related to connected cars in a single platform, preprocessing the big data, and storing the preprocessed data at a high speed to make it unnecessary to preprocess each of the stored data whenever the data is used. In addition, the high-speed storage of the integrated big data enables to save cost and time.

In operation S110, the acquisition device 100 receives the raw data. That is, the acquisition device 100 receives the raw data, which is all data that can be acquired in connection with the connected cars, from the device associated with the data production layer. The raw data may include at least one of the B2B data, the B2C data, and the infrastructure data. The device associated with the data production layer also includes at least one of the B2B data production device 210, the B2C data production device 230, the infrastructure data production device 250, the dynamic data production device 270, and the static data production device 290.

In operation S130, the acquisition device 100 generates the preprocessed data by preprocessing the raw data. The acquisition device 100 preprocesses the raw data to convert the format of the raw data which may have one of various formats into the single standardized format. For this purpose, the data collector 31 may include the integrated platform combining the devices associated with the data production layer, the data receiving layer, and the service using layer for the raw data.

In operation S150, the acquisition device 100 stores the preprocessed data at a high speed. The acquisition device 100 stores the preprocessed data at a high speed using the fast storing algorithm. That is, the acquisition device 100 may store the preprocessed data in the storage 50 by the asynchronous multiprocessing while adaptively the changing the size of the chunk unit of the preprocessed data according to the memory availability ratio. At this time, the acquisition device 100 may store the preprocessed data separately for the dynamic data and the static data.

Although not shown in the drawings, when the acquisition device 100 receives the service request from the device associated with the service using layer, the acquisition device 100 may provide the preprocessed data related to the service request among the stored preprocessed data to the device having sent the service request.

Figure 6:
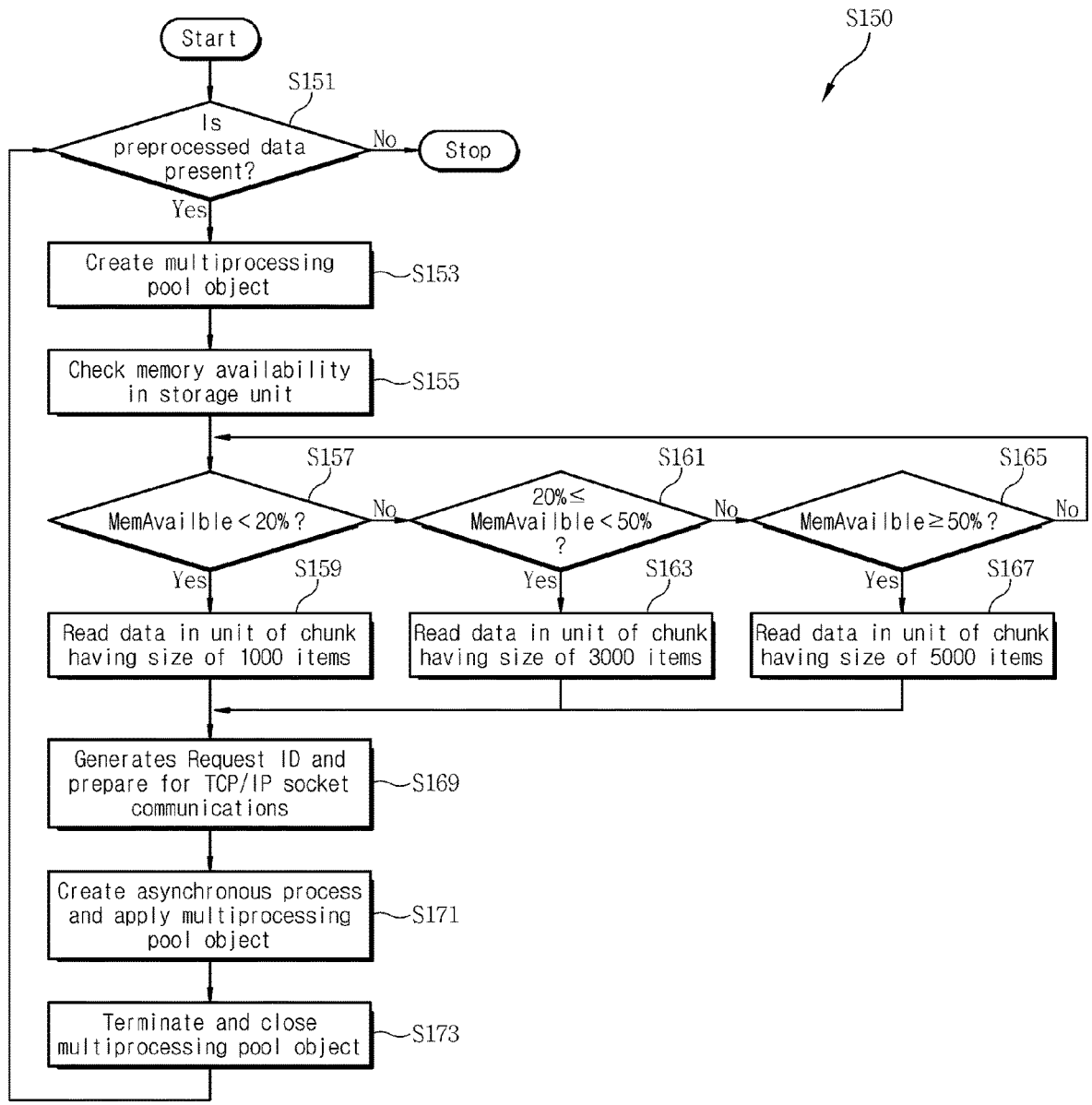
FIG. 6 is a flowchart for describing a fast storing operation shown in FIG. 5 in detail.

FIG. 6 is a flowchart for describing the fast storing operation of S150 shown in FIG. 5 in detail.

Referring to FIGS. 5 and 6, the preprocessed data is stored at a high speed using the fast storing algorithm according to the acquisition method. The fast storing algorithm may be performed according to following operations.

In operation S151, the acquisition device 100 checks whether or not there is any preprocessed data to be stored. If it is determined that there is any preprocessed data to be stored, the procedure proceeds with an operation S153. If, however, it is determined that there is no preprocessed data to be stored, the acquisition device 100 terminates the fast storing procedure.

In operation S153, the acquisition device 100 creates a multiprocessing pool object. The acquisition device 100 allocates memory spaces for performing the multiprocessing.

In operation S155, the acquisition device 100 checks the memory availability ratio of the storage 50. The acquisition device 100 calculates the memory availability ratio using the equation 1 and checks the calculated memory availability ratio.

In operation S157, the acquisition device 100 checks whether the memory availability ratio is smaller than 20%. If the memory availability ratio is smaller than 20%, the procedure proceeds with an operation S159. Meanwhile, if the memory availability ratio is greater than or equal to 20%, the procedure proceeds with an operation S161.

In the operation S159, the acquisition device 100 reads the preprocessed data in the unit of the chunk having a size of 1000 items. For example, the acquisition device 100 may fragment the preprocessed data into chunks each of which has the size of 1000 items to read the preprocessed data in the chunk units.

In the operation S161, the acquisition device 100 checks whether the memory availability ratio is greater than or equal to 20% and smaller than 50%. If the memory availability ratio is greater than or equal to 20% and smaller than 50%, the procedure proceeds with an operation S163. Meanwhile, if the memory availability ratio is greater than or equal to 20% but is not smaller than 50%, the procedure proceeds with an operation S165.

In the operation S163, the acquisition device 100 reads the preprocessed data in the unit of the chunk having a size of 3000 items. For example, the acquisition device 100 may fragment the preprocessed data into chunks each of which has the size of 3000 items to read the preprocessed data in the chunk units.

In the operation S165, the acquisition device 100 checks whether the memory availability ratio is greater than or equal to 50%. If the memory availability ratio is greater than or equal to 50%, the procedure proceeds with an operation S167. Meanwhile, if the memory availability ratio is smaller than 50%, the procedure returns to the operation S157.

In the operation S167, the acquisition device 100 reads the preprocessed data in the unit of the chunk having a size of 5000 items. For example, the acquisition device 100 may fragment the preprocessed data into chunks each of which has the size of 5000 items to read the preprocessed data in the chunk units.

In the operation S169, the acquisition device 100 generates a Request ID and prepares for TCP/IP socket communications. The acquisition device 100 may generate the Request ID for each of the data chunks to transmit the preprocessed data in the unit of the chunk through the TCP/IP socket communications.

In operation S171, the acquisition device 100 creates an asynchronous process through the TCP/IP socket communications and applies the multiprocessing pool object to allow the preprocessed data to be transmitted and stored in each session.

In operation S173, the acquisition device 100 terminates and closes the multiprocessing pool object, and may release the memory allocated for the multiprocessing. Subsequently, the acquisition device 100 may perform the operation S151 to check whether there is any preprocessed data that is not stored yet.

In operation S153, the acquisition device 100 creates a multiprocessing pool object. The acquisition device 100 allocates memory spaces for performing the multiprocessing.

Through the chunk size is set, in the above description, differently for the cases that the memory availability ratio is smaller than 20%, greater than or equal to 20% and smaller than 50%, and greater than or equal to 50%, the present disclosure is not limited thereto. The chunk size may be set based on another criteria for the memory availability ratio depending on the environment of the acquisition device 100.

The present disclosure can be implemented by computer-readable codes stored in on a computer-readable recording medium. The computer-readable recording medium may include any recording devices which store data that can be read out by a computer device. Examples of the computer-readable recording medium include a hard disk, a ROM, a RAM, a CD-ROM, a magnetic tape, a floppy disk, an optical data storage device. Also, the present disclosure can be implemented based on a carrier wave which may be related to a transmission through Internet.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made therein without departing from the spirit and scope as defined by the following claims.

DESCRIPTION OF REFERENCE NUMERALS

10: Interface
11: Southbound interface
13: Northbound interface
30: Controller
31: Data collector
33: Fast storing processor
50: Storage
100: Connected car big data acquisition device
210: B2B data production device
230: B2C data production device
250: Infrastructure data production device
270: Dynamic data production device
290: Static data production device
300: User terminal
400, 500: Connected car big data collecting system

What is claimed is:

1. A connected car big data acquisition device, comprising:
an interface configured to communicate with a device associated with a data production layer and a device associated with a service using layer;
a storage configured to store data; and
a controller configured to generate preprocessed data based on raw data related to connected cars received from the device associated with the data production layer through a preprocessing process using an integrated platform and to control the preprocessed data to be stored in the storage based on a memory availability ratio of the storage,
the controlling including creating multiprocessing pool object, determining the memory availability ratio of the storage, and storing the preprocessed data using the multiprocessing pool object by fragmenting the preprocessed data in a unit of a chunk having a size, and
the size of the chunk being adaptively determined based on the memory availability ratio of the storage,
wherein in response to the memory availability ratio being less than a first preset threshold, the controlling further includes fragmenting the preprocessed data in a unit of a chunk having a first preset size as the size of the chunk, and
wherein in response to the memory availability ratio being no less than a second preset threshold, the controlling further includes fragmenting the preprocessed data in a unit of a chunk having a second preset size.

2. The connected car big data acquisition device of claim 1, wherein the controller comprises the integrated platform combining the device associated with the data production layer, a device associated with a data receiving layer, and the device associated with the service using layer for the raw data.

3. The connected car big data acquisition device of claim 1, wherein the controller controls the preprocessed data to be stored in the storage separately for dynamic data and static data.

4. The connected car big data acquisition device of claim 1, wherein the controller calculates the memory availability ratio of the storage by a following equation:

$$MemAvailable(\%) = 100 - \left(\frac{MemTotal - MemFree}{MemTotal} \times 100\right)$$

where 'MemAvailable' refers to the memory availability ratio, 'MemTotal' refers to a total capacity of the memory, and 'MemFree' refers to a memory capacity currently being unused.

5. The connected car big data acquisition device of claim 1, wherein the controller sets the size of the chunk larger as the memory availability ratio is larger.

6. The connected car big data acquisition device of claim 1,
wherein the controller stores the preprocessed data fragmented into a plurality of chunks in the storage by an asynchronous multiprocessing, while adaptively changing the size of the chunk unit of the preprocessed data according to the memory availability ratio, and
wherein the controller stores the preprocessed data separately for the dynamic data and the static data.

7. The connected car big data acquisition device of claim 1, wherein, when a service request is received from the device associated with the service using layer, the controller is configured to provide data related to the service request among preprocessed data stored in the storage to the device having sent the service request.

8. The connected car big data acquisition device of claim 1, wherein the raw data includes business-to-business (B2B) data, business-to-consumer (B2C) data, and infrastructure data in terms of a business while including dynamic data and static data on a real-time basis.

9. A connected car big data collecting system, comprising:
a business-to-business (B2B) data production device configured to produce B2B data which is dynamic vehicle data in a course of business;
a business-to-consumer (B2C) data production device configured to produce B2C data which is dynamic vehicle data and occupied by a driver or a passenger;
an infrastructure data production device configured to produce dynamic infrastructure data and static infrastructure data related to an infrastructure of a connected car;
at least one user terminal configured to enable a user to receive a service related to the connected car; and
a connected car big data acquisition device configured to receive raw data including at least one of the B2B data, the B2C data, and the infrastructure data from the B2B data production device, the B2C data production device, and the infrastructure data production device, respectively, preprocess the raw data, store preprocessed data, and, upon receiving a service request from the user terminal, provide data related to the service request to the user terminal,
wherein the connected car big data acquisition device comprises:
an interface configured to communicate with the B2B data production device, the B2C data production device, the infrastructure data production device, and the user terminal;
a storage configured to store data; and
a controller configured to generate preprocessed data based on the raw data through a preprocessing process using an integrated platform and to control the preprocessed data to be stored in the storage based on a memory availability ratio of the storage,
the controlling including creating multiprocessing pool object, determining the memory availability ratio of the storage, and storing the preprocessed data using the multiprocessing pool object by fragmenting the preprocessed data in a unit of a chunk having a size, and
the size of the chunk being adaptively determined based on the memory availability ratio of the storage,
wherein in response to the memory availability ratio being less than a first preset threshold, the controlling further includes fragmenting the preprocessed data in a unit of a chunk having a first preset size as the size of the chunk, and
wherein in response to the memory availability ratio being no less than a second preset threshold, the controlling further includes fragmenting the preprocessed data in a unit of a chunk having a second preset size.

10. A connected car big data collecting system, comprising:
a dynamic data production device configured to produce dynamic vehicle data generated with regard to a business entity, a driver, or a passenger, and dynamic infrastructure data related to an infrastructure of a connected car;
a static data production device configured to produce static infrastructure data related to the infrastructure;
at least one user terminal configured to enable a user to receive a service related to the connected car; and
a connected car big data acquisition device configured to receive raw data including at least one of the dynamic vehicle data, the dynamic infrastructure data, and the static infrastructure data from the dynamic data production device or the static data production device, preprocess the raw data, store preprocessed data, and, upon receiving a service request from the user terminal, provide data related to the service request to the user terminal,
wherein the connected car big data acquisition device comprises:
an interface configured to communicate with the dynamic data production device, the static data production device, and the user terminal;
a storage configured to store data; and
a controller configured to generate preprocessed data based on the raw data through a preprocessing process using an integrated platform and to control the storage to store the preprocessed data in the storage based on a memory availability ratio of the storage,
the controlling including creating multiprocessing pool object, determining the memory availability ratio of the storage, and storing the preprocessed data using the multiprocessing pool object by fragmenting the preprocessed data in a unit of a chunk having a size, and the size of the chunk being adaptively determined based on the memory availability ratio of the storage, wherein in response to the memory availability ratio being less than a first preset threshold, the controlling further includes fragmenting the preprocessed data in a unit of a chunk having a first preset size as the size of the chunk, and wherein in response to the memory availability ratio being no less than a second preset threshold, the controlling further includes fragmenting the preprocessed data in a unit of a chunk having a second preset size.

11. A connected car big data collecting method, comprising:

receiving raw data related a connected car, by a connected car big data acquisition device, from devices associated with a data production layer;

generating preprocessed data by preprocessing the raw data, by the connected car big data acquisition device, by using an integrated platform combining devices associated with the data production layer; and controlling a storage to store the preprocessed data, by the connected car big data acquisition device, according to a memory availability ratio of the storage, the controlling including creating multiprocessing pool object, determining the memory availability ratio of the storage, and storing the preprocessed data using the multiprocessing pool object by fragmenting the preprocessed data in a unit of a chunk having a size, and the size of the chunk being adaptively determined based on the memory availability ratio of the storage, wherein in response to the memory availability ratio being less than a first preset threshold, the controlling further includes fragmenting the preprocessed data in a unit of a chunk having a first preset size as the size of the chunk, and wherein in response to the memory availability ratio being no less than a second preset threshold, the controlling further includes fragmenting the preprocessed data in a unit of a chunk having a second preset size.

12. The connected car big data collecting method of claim 11, wherein the integrated platform combines the devices associated with the data production layer, a device associated with a data receiving layer, and a device associated with a service using layer for the raw data.

13. The connected car big data collecting method of claim 11, wherein the controlling includes controlling the storage to store the preprocessed data in the storage separately for dynamic data and static data.

14. The connected car big data collecting method of claim 11, wherein the controlling includes calculating the memory availability ratio of the storage by a following equation:

$$\text{MemAvailable}(\%) = 100 - \left(\frac{\text{MemTotal} - \text{MemFree}}{\text{MemTotal}} \times 100\right)$$

where 'MemAvailable' refers to the memory availability ratio, 'MemTotal' refers to a total capacity of the memory, and 'MemFree' refers to a memory capacity currently being unused.

15. The connected car big data collecting method of claim 11, wherein the controlling includes adaptively setting the size of the chunk larger as the memory availability ratio is larger.

16. The connected car big data collecting method of claim 11, wherein the controlling includes storing the preprocessed data fragmented into a plurality of chunks in the storage by an asynchronous multiprocessing.

17. The connected car big data collecting method of claim 16, further comprises:

adaptively changing the size of the chunk unit of the preprocessed data according to the memory availability ratio while the controlling includes storing the preprocessed data, wherein the controlling includes storing the preprocessed data separately for the dynamic data and the static data.

18. The connected car big data collecting method of claim 11, wherein, when a service request is received from a device associated with a service using layer, the controlling includes providing data related to the service request among preprocessed data stored in the storage to a device having sent the service request.

19. The connected car big data collecting method of claim 11, wherein the raw data includes business-to-business (B2B) data, business-to-consumer (B2C) data, and infrastructure data in terms of a business while including dynamic data and static data on a real-time basis.

* * * * *